(12) United States Patent
Kim et al.

(10) Patent No.: US 8,957,156 B2
(45) Date of Patent: *Feb. 17, 2015

(54) OPTICAL ADHESIVE COMPOSITION FOR DISPLAYS, OPTICAL ADHESIVE FILM PREPARED FROM THE SAME, AND DISPLAY PANEL INCLUDING THE SAME

(75) Inventors: Lee June Kim, Uiwang-si (KR); Ji Hye Kwon, Uiwang-si (KR); Kyoung Jin Ha, Uiwang-si (KR); Kil sung Lee, Uiwang-si (KR)

(73) Assignee: Cheil Industries, Inc., Gumi-si, Kyeongsangbuk-do (KR)

(*) Notice: Subject to any disclaimer, the term of this patent is extended or adjusted under 35 U.S.C. 154(b) by 9 days.

This patent is subject to a terminal disclaimer.

(21) Appl. No.: 13/337,526

(22) Filed: Dec. 27, 2011

(65) Prior Publication Data

US 2012/0172484 A1    Jul. 5, 2012

(30) Foreign Application Priority Data

Dec. 31, 2010 (KR) .......... 10-2010-0140045
Dec. 8, 2011  (KR) .......... 10-2011-0131375

(51) Int. Cl.
| | |
|---|---|
| *C09J 175/12* | (2006.01) |
| *C09J 175/16* | (2006.01) |
| *C08L 75/12*  | (2006.01) |
| *C08L 75/16*  | (2006.01) |
| *C08G 18/81*  | (2006.01) |

(52) U.S. Cl.
USPC .......... 525/123; 522/90; 522/96; 522/97; 525/127; 525/455; 525/460; 528/75

(58) Field of Classification Search
USPC ........ 522/90, 96, 97; 525/123, 127, 455, 460; 528/75
See application file for complete search history.

(56) References Cited

U.S. PATENT DOCUMENTS

| 8,834,670 B2* | 9/2014 | Ha et al. ............. 156/331.7 |
| 2008/0108721 A1* | 5/2008 | Ha et al. ............. 522/33 |
| 2010/0273909 A1* | 10/2010 | Ogawa et al. ....... 522/90 |
| 2011/0201717 A1 | 8/2011 | Held et al. |
| 2012/0165465 A1 | 6/2012 | Kim et al. |
| 2012/0172481 A1* | 7/2012 | Ha et al. ............. 522/92 |
| 2012/0172482 A1* | 7/2012 | Ha et al. ............. 522/96 |

FOREIGN PATENT DOCUMENTS

| CN | 1566244 A |   | 1/2005 |
| CN | 1995259 A | * | 7/2007 |
| CN | 101314629 A | * | 12/2008 |
| CN | 102585712 A |   | 7/2012 |
| JP | 2000/44890 A | * | 2/2000 |
| JP | 2006/104296 | * | 4/2006 |
| TW | 2009-27779 A |   | 7/2009 |
| TW | 200942562 A |   | 10/2009 |
| TW | 2010-41747 A |   | 12/2010 |
| WO | WO 2009/086491 A1 | * | 7/2009 |

OTHER PUBLICATIONS

Chinese Office Action in CN 201110443385.5, dated Jul. 9, 2013, with English translation (Kim, et al.).
Office Action mailed Jan. 21, 2014 in corresponding Taiwanese Patent Application No. 100148592.

* cited by examiner

*Primary Examiner* — Rabon Sergent
(74) *Attorney, Agent, or Firm* — Lee & Morse, P.C.

(57) ABSTRACT

An optical adhesive film prepared from an optical adhesive composition, an optical adhesive composition, and a display panel, the optical adhesive film having an elongation of about 200 to about 800% and a tensile strength of about 10 gf/mm$^2$ or less, and the optical adhesive composition including a urethane (meth)acrylate copolymer, a reactive monomer, and an initiator.

26 Claims, 2 Drawing Sheets

OPTICAL ADHESIVE COMPOSITION FOR DISPLAYS, OPTICAL ADHESIVE FILM PREPARED FROM THE SAME, AND DISPLAY PANEL INCLUDING THE SAME

BACKGROUND

1. Field

Embodiments relate to an optical adhesive composition for displays, an optical adhesive film prepared from the same, and a display panel including the same.

2. Description of the Related Art

With recent development of electric, electronic, and communications technologies, various electric devices using a touch window or touch screen device (in which a touch panel and an LCD window panel are integrated) have been considered. An optically clear adhesive (OCA) film may be included between a window glass sheet and a glass panel of a touchscreen sensor. The OCA film may be used for bonding layers to stack when manufacturing an LCD or for bonding a touchscreen of a mobile phone. The OCA film may transmit at least 97% of light irradiated thereto, thus having transparency like, e.g., glass. Further, the OCA film may increase screen definition while providing good adhesion, as compared with a double-sided tape.

SUMMARY

Embodiments are directed to an optical adhesive composition for displays, an optical adhesive film prepared from the same, and a display panel including the same The embodiments may be realized by providing an optical adhesive film prepared from an optical adhesive composition, the optical adhesive film having an elongation of about 200 to about 800% and a tensile strength of about 10 gf/mm² or less after curing, and the optical adhesive composition including a urethane (meth)acrylate copolymer, a reactive monomer, and an initiator.

The urethane (meth)acrylate copolymer may include a hydroxyl group and a vinyl group.

The tensile strength may be about 0.1 to about 10 gf/mm².

The urethane (meth)acrylate copolymer may include a copolymer obtained by copolymerization of a urethane polyol and a monomer having an isocyanate group and a vinyl group.

The urethane polyol may include a hydroxyl group.

The urethane polyol may include a copolymer obtained by copolymerization of a polyol and an isocyanate compound.

The isocyanate compound may have a structure represented by Formula 1:

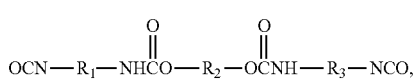

and $R_1$, $R_2$, and $R_3$ may each independently be $-(CH_2)_n-$, in which n is an integer from 1 to about 10.

The urethane (meth)acrylate copolymer may be further polymerized with a monomer having a silane group and an isocyanate group.

The embodiments may also be realized by providing an optical adhesive composition including a reactive monomer, an initiator, and a urethane (meth)acrylate copolymer, the urethane (meth)acrylate copolymer including a copolymer obtained by copolymerization of a urethane polyol and a (meth)acrylic monomer having an isocyanate group and a vinyl group.

The urethane polyol may include a hydroxyl group.

The optical adhesive composition may further include at least one selected from the group of UV absorbents and antioxidants.

The urethane polyol may include a copolymer obtained by copolymerization of a polyol and an isocyanate compound.

The isocyanate compound may have a structure represented by Formula 1:

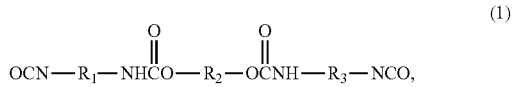

and $R_1$, $R_2$, and $R_3$ may each independently be $-(CH_2)_n-$, in which n is an integer from 1 to about 10.

The polyol may include at least one selected from the group of ethylene glycol, polyethylene glycol, propylene glycol, polypropylene glycol, polytetramethylene glycol, tetramethylene glycol, 1,3-butanediol, 1,4-butanediol, 1,6-hexanediol, neopentyl glycol, polycarbonate polyol, polyester polyol, and 1,4-cyclohexane dimethanol.

The urethane (meth)acrylate copolymer may be present in the optical adhesive composition in an amount of about 35 to about 93.45%.

The copolymerization may be performed in the presence of at least one catalyst selected from the group of dibutyltin dilaurate (DBTDL), triethylenediamine (TEDA), and 1,4-diazabicyclo[2.2.2]octane.

The catalyst may be present in an amount of about 0.05 to about 2 parts by weight, based on 100 parts by weight of the isocyanate compound.

The copolymer may be further polymerized with a monomer having a silane group and an isocyanate group.

The optical adhesive composition may further include a silane coupling agent.

The monomer having the isocyanate group and the vinyl group may include at least one selected from the group of (meth)acryloyloxyethyl isocyanate and 3-isocyanatopropyl (meth)acrylate.

The reactive monomer may include a reactive (meth)acrylate monomer.

The reactive monomer may include at least one selected from the group of a (meth)acrylic acid ester having a hydroxyl group and a C2 to C20 alkyl group, a (meth)acrylic acid ester having a C6 to C20 polyalicyclic rings, a (meth)acrylic monomer having a C4 to C6 heteroalicyclic ring including nitrogen, oxygen, or sulfur, a (meth)acrylic monomer containing a carboxyl group, and a monomer having a vinyl group and a silane group.

The initiator may include a photoinitiator.

The optical adhesive composition may have a curing contraction ratio of about 1% or less.

The optical adhesive composition may have a viscosity of about 500 to about 20,000 cps at 25° C.

The embodiments may also be realized by providing a display panel comprising the optical adhesive film according to an embodiment.

BRIEF DESCRIPTION OF DRAWINGS

Features will become apparent to those of ordinary skill in the art by describing in detail exemplary embodiments with reference to the attached drawings in which.

DETAILED DESCRIPTION

Figure 1:
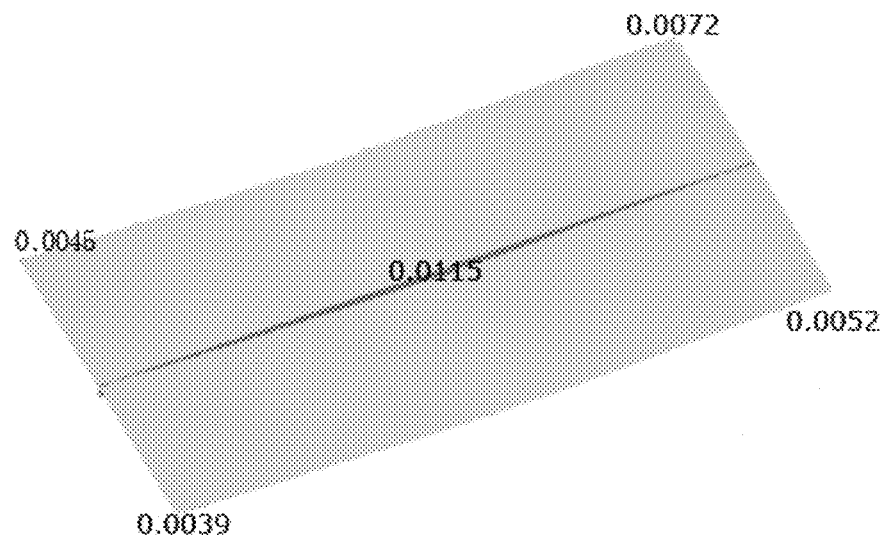
FIG. 1 illustrates a perspective view of an optical adhesive composition according to Example 1 after photo-curing.

Korean Patent Application Nos. 10-2010-0140045, filed on Dec. 31, 2010 and No 10-2011-0131375, filed on Dec. 8, 2011, in the Korean Intellectual Property Office, and entitled: "Optical Adhesive Composition for Displays, Optical Adhesive Film Prepared from the Same, and Display Panel Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

In accordance with an embodiment, an optical adhesive composition may include a urethane (meth)acrylate copolymer, a reactive monomer, and an initiator. The optical adhesive composition may provide an optical adhesive film having an elongation of about 200 to 800% and a tensile strength of about 10 gf/mm$^2$ or less after curing.

In accordance with another embodiment, an optical adhesive film may be formed by depositing the optical adhesive composition on an adherend, e.g., between glass and a transparent conductive film. The optical adhesive film may be cured while bonding the adherends.

The elongation and the tensile strength may be evaluated by any suitable method, e.g., ASTM D638. In an embodiment, the optical adhesive composition is deposited on a polyethylene terephthalate (PET) release film and cured at about 3,000 to 5,000 mJ/cm$^2$, followed by measurement of elongation and tensile strength of the optical adhesive film having a thickness of about 500 μm.

Maintaining the elongation at about 200% or greater may help reduce or prevent contraction of the optical adhesive film after bonding two adherends. Maintaining the elongation at about 800% or less may help ensure that the optical adhesive film is not too soft and tacky, thereby exhibiting desirable properties in reworking. Maintaining the tensile strength at about 10 gf/mm$^2$ or less may help ensure that the optical adhesive film has good adhesion as well as sufficiently low strength, thereby ensuring good impact resistance when impact occurs to a display product. In an implementation, the elongation may be about 400 to about 710%, and the tensile strength may be about 0.1 to about 10 gf/mm$^2$.

The optical adhesive film may be prepared from the optical adhesive composition containing a urethane (meth)acrylate copolymer, a reactive monomer, and an initiator. The optical adhesive composition may be in a liquid form, may have a viscosity of about 500 to about 20,000 cps at 25° C., and may be applied to or injected into an adherend or may be used as a film obtained by depositing the optical adhesive composition on a PET release film.

Urethane (meth)acrylate Copolymer

The urethane (meth)acrylate copolymer may include a hydroxyl group and a vinyl group. For example, the hydroxyl group and the vinyl group may be disposed at terminal ends of the urethane (meth)acrylate copolymer.

The urethane (meth)acrylate copolymer may be a copolymer obtained by copolymerization of a urethane polyol and a (meth)acrylic monomer having an isocyanate group and a vinyl group. In an implementation, the urethane polyol may be a copolymer obtained by copolymerization of a polyol and an isocyanate compound.

The urethane (meth)acrylate copolymer may be obtained by preparing the urethane polyol through first polymerizing the polyol and an isocyanate compound (e.g., represented by Formula 1, below), and then by polymerizing the urethane polyol with the (meth)acrylic monomer having an isocyanate group and a vinyl group.

The urethane polyol may have a urethane bond and a hydroxyl group. The urethane polyol may be prepared by polymerization of an excess of the polyol with a relatively small amount of the isocyanate compound (e.g., represented by Formula 1). Thus, the urethane polyol may include both a urethane bond and a hydroxyl terminal. The hydroxyl group of the urethane polyol may be polymerized with the (meth)acrylic monomer having the isocyanate group and the vinyl group to form a urethane bond, so that the urethane (meth)acrylate copolymer may include the hydroxyl group and the vinyl group, e.g., at the terminal ends thereof.

The urethane (meth)acrylate copolymer may have a weight average molecular weight of about 5,000 to about 50,000 g/mol.

The urethane (meth)acrylate copolymer may be present in the optical adhesive composition in an amount of about 35 to 93.45%, in terms of solid content. Within this range, the urethane (meth)acrylate copolymer may exhibit main properties, a high elongation, a low tensile strength, and a low curing contraction ratio. In an implementation, the urethane (meth)acrylate copolymer may be present in the optical adhesive composition in an amount of about 77 to about 87%.

In the urethane (meth)acrylate copolymer, a ratio of equivalent weights of the polyol, the isocyanate compound and the (meth)acrylic monomer having the isocyanate group and the vinyl group may be suitably adjusted. For example, the polyol, the isocyanate compound, and the (meth)acrylic monomer having the isocyanate group and the vinyl group may be polymerized at an equivalent-weight ratio of about 1:0.75~0.85:0.15~0.25. Within this range, the urethane (meth)acrylate copolymer may have major properties, such as high elongation, low tensile strength, and low contraction ratio.

The polyol may include at least one selected from the group of ethylene glycol, polyethylene glycol, propylene glycol, polypropylene glycol, polytetramethylene glycol, tetramethylene glycol, 1,3-butanediol, 1,4-butanediol, 1,6-hexanediol, neopentyl glycol, polycarbonate polyol, polyester polyol, and 1,4-cyclohexane dimethanol, without being limited thereto.

The isocyanate compound may be an isocyanate compound with two or more —NCO groups.

The isocyanate compound may be an isocyanate that includes a carbamate or a carbamide moiety. The isocyanate compound may include at least one selected from the group of biuret-type, isocyanurate-type, adduct-type, and bifunctional prepolymer-type isocyanate compounds, without being limited thereto.

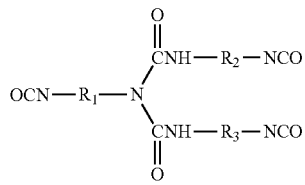

\* Biuret-type isocyanate compound

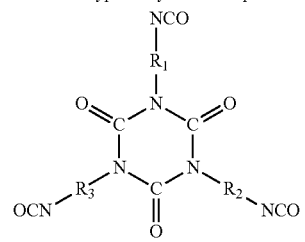

\* Isocyanurate-type isocyanate compound

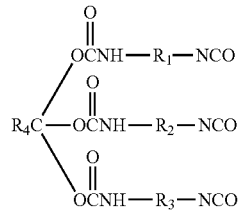

\* Adduct-type isocyanate compound

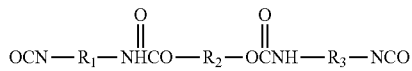

\* Bifunctional prepolymer-type isocyanate compound

In the above formulae, $R_1$, $R_2$, and $R_3$ may each independently be $-(CH_2)_n-$, n may be an integer of 1 to about 20, and R4 may be hydrogen, a C1 to C6 alkyl group, a C1 to C6 alkoxy group, or halogen.

In an implementation, the isocyanate compound may be represented by Formula 1, below.

[Formula 1]

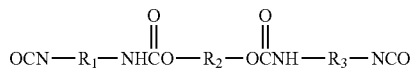

In Formula 1, $R_1$, $R_2$, and $R_3$ may each independently be $-(CH_2)_n-$, and n may be an integer of 1 to about 10.

In an implementation, the isocyanate compound may further include at least one selected from the group of biuret-type, isocyanurate-type and adduct-type above without being limited thereto, in addition to the isocyanate compound represented by Formula 1.

In an implementation, the isocyanate compound may further include an diisocyanate compound generally known to one skilled in the art, in addition to the isocyanate compound represented by Formula 1. Such diisocyanate compound may include at least one selected from the group of isophorone, hexamethylene, and toluene diisocyanate compounds, without being limited thereto. For example, the diisocyanate compound may include at least one selected from the group of toluene diisocyanate, diphenylmethane diisocyanate, isophorone diisocyanate, hexamethylene diisocyanate, xylene diisocyanate, hydrogenated diphenylmethane diisocyanate, and naphthalene diisocyanate.

The (meth)acrylic monomer having the isocyanate group and the vinyl group may include at least one selected from the group of 2-(meth)acryloyloxyethyl isocyanate (MOI) and 3-isocyanatopropyl(meth)acrylate, without being limited thereto.

Polymerization of the polyol, the isocyanate compound, and the (meth)acrylic monomer having the isocyanate group and the vinyl group may be carried out by any suitable polymerization method, e.g., bulk polymerization, emulsion polymerization, or suspension polymerization, without being limited thereto. Polymerization may be performed at about 40 to about 80° C. for about 2 to about 24 hours.

Polymerization may be performed in the absence of a catalyst or in the presence of a catalyst to prepare the copolymer. In an implementation, the polymerization may be performed in the presence of the catalyst. The catalyst may include at least one selected from the group of dibutyltin dilaurate (DBTDL), triethylenediamine (TEDA), and 1,4-diazabicyclo [2.2.2]octane, without being limited thereto. The catalyst may be present in an amount of about 0.05 to about 2 parts by weight, based on 100 parts by weight of the isocyanate compound.

The urethane (meth)acrylate copolymer may be further polymerized with a monomer having a silane group and an isocyanate group. The monomer having the silane group may be combined with the hydroxyl group of the urethane (meth) acrylate copolymer. In an implementation, the monomer having the silane group and the isocyanate group may include, e.g., 3-isocyanatopropyltriethoxysilane. The monomer having the silane group and the isocyanate group may be present in an equivalent weight of about 0.1 to about 2, with respect to an equivalent weight of a polyol of 1.

Reactive Monomer

The reactive monomer may include at least one selected from the group of a hydroxyl group containing monomer, an alkyl group containing monomer, a carboxyl group containing monomer, and a monomer containing a vinyl group and a silane group. In an implementation, the reactive monomer may include the hydroxyl group containing monomer, the alkyl group containing monomer, an alicyclic group containing monomer, the carboxyl group containing monomer, and/ or the monomer containing a vinyl group and a silane group.

The reactive monomer may be present in the optical adhesive composition in an amount of about 5 to about 45 wt %, in terms of solid content. Within this range, the viscosity of materials may be adjusted to provide desired workability, and a low contraction ratio may be exhibited. In an implementation, the reactive monomer may be present in the optical adhesive composition in an amount of about 8 to about 38 wt %.

The reactive monomer may include a reactive (meth)acrylate monomer having one of the aforementioned functional groups, e.g., hydroxyl group, alkyl group, alicyclic group, carboxyl group, vinyl group, or silane group.

The hydroxyl group containing monomer may include a hydroxyl group containing (meth)acrylic acid ester, e.g., a (meth)acrylic acid ester that includes a hydroxyl group at a terminal or in a structure thereof and has a C2 to C20 alkyl group. For example, the hydroxyl group containing monomer may include at least one selected from the group of 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl (meth)acrylate, 1,4-cyclohexanedimethanol mono(meth)acrylate, 1-chloro-2-hydroxypropyl(meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl (meth)acrylate, 4-hydroxycyclopentyl(meth)acrylate, 4-hydroxycyclohexyl (meth)acrylate, and cyclohexane dimethanol mono(meth)acrylate, without being limited thereto. The hydroxyl group containing monomer may be present in the optical adhesive composition in an amount of about 1 to about 25 wt %, e.g., about 2 to about 19 wt %. Within this range, desired modulus may be obtained after curing.

The alkyl group containing monomer may include a (meth)acrylic acid ester having a C1 to C20 linear or branched alkyl group (which is not cyclic), a (meth)acrylic acid ester having a C4 to C20 mono alicyclic or poly alicyclic rings, or a (meth)acrylic monomer having a C4 to C20 hetero alycyclic ring including a heteroatom, e.g., nitrogen, oxygen, or sulfur. For example, the alkyl group containing monomer may include (meth)acrylic acid ester having a C6 to C20 polyalicyclic rings, a (meth)acrylic monomer having a C4 to C6 heteroalicyclic ring including nitrogen, oxygen, or sulfur, or a mixture thereof. For example, the alkyl group containing monomer may include at least one selected from the group of isobornyl(meth)acrylate, acryloyl morpholine, cyclohexyl (meth)acrylate, cyclopentyl(meth)acrylate, methyl(meth)acrylate, ethyl(meth)acrylate, n-propyl(meth)acrylate, isopropyl(meth)acrylate, n-butyl(meth)acrylate, t-butyl(meth)acrylate, iso-butyl(meth)acrylate, pentyl(meth)acrylate, hexyl(meth)acrylate, heptyl(meth)acrylate, octyl(meth)acrylate, 2-ethylhexylacrylate, nonyl(meth)acrylate, decyl(meth)acrylate, and lauryl(meth)acrylate, without being limited thereto. The alkyl group containing monomer may be present in the optical adhesive composition in an amount of about 1 to about 20 wt %, e.g., about 3 to about 14 wt %. Within this range, coating may be facilitated and a low curing contraction ratio may be obtained in curing.

The carboxyl group containing monomer may include at least one selected from the group of β-carboxyethyl(meth)acrylate, (meth)acrylic acid, itaconic acid, maleic acid, fumaric acid, vinyl acetate, acrylic acid, and methacrylic acid, without being limited thereto. The carboxyl group containing monomer may be present in the optical adhesive composition in an amount of about 1 to about 10 wt %, e.g., about 3 to about 5 wt %. Within this range, coating of the optical adhesive composition may be facilitated and a low curing contraction ratio may be obtained in curing.

The monomer containing the vinyl group and the silane group may help improve adhesion to glass. The monomer containing the vinyl group and the silane group may include a monomer represented by (R1)(R2)(R3)Si—(CH2)m-(OOC)p-CH=CH$_2$ (in which, R1, R2, and R3 may each independently be hydrogen, halogen, a C1 to 10 alkyl group, or a C1 to C10 alkoxy group, m is 0~10, and p is 0~10). For example, the monomer may include at least one selected from the group of vinyltrichlorosilane, vinyltrimethoxysilane, vinylmethyldimethoxysilane, and vinyltriethoxysilane, without being limited thereto.

The monomer containing the vinyl group and the silane group may be present in the optical adhesive composition in an amount of about 1 to about 20 wt %. Within this range, coating may be facilitated and a low curing contraction ratio may be obtained in curing.

Initiator

The initiator may include a photoinitiator. The initiator may include any suitable compound that performs excellent photo reaction in a UV wavelength range of about 150 to about 500 nm.

For example, the initiator may include at least one selected from the group of acetophenones, benzophenones, triazines, thioxanthones, benzoins, and oximes, without being limited thereto. Examples of the initiator may include 1-hydroxycyclohexyl phenyl ketone, 2-[2-oxo-2-phenylacetoxyethoxy] ethyl oxyphenylacetate, benzophenone, 4-phenylbenzophenone, hydroxybenzophenone, acrylated benzophenone, 4,4'-bis(dimethylamino)benzophenone, 4,4'-bis(diethylamino) benzophenone, 2,2'-diethoxyacetophenone, 2,2'-dibutoxyacetophenone, 2-hydroxy-2-methylpropiophenone, 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, thioxanthone, 2-methylthioxanthone, benzoin, and/or benzoin methyl ether.

The initiator may be present in the optical adhesive composition in an amount of about 1 to about 20 wt %, e.g., about 5 to about 8 wt %, in terms of solid content. Within this range, the optical adhesive film prepared from the optical adhesive composition may exhibit high elongation, low tensile strength, and a low curing contraction ratio after curing by UV exposure.

The optical adhesive composition may further include at least one selected from the group of UV absorbents and antioxidants.

UV Absorbent

The UV absorbent may help improve optical stability of the adhesive composition. The UV absorbent may include, e.g., at least one selected from the group of benzotriazole, benzophenone, and triazine compounds. Examples of the UV absorbent may include 3-(2H-benzotriazol-2-yl)-5-(1,1-dimethylethyl)-4-hydroxy-benzenepropanoic acid C7 to C9 linear or branched alkyl ester, 2-(benzotriazole-2-yl)-4-(2,4,4-trimethylpentane-2-yl)phenol, 2-(2'-hydroxy-5'-methylphenyl)benzotriazole, 2-[2'-hydroxy-3',5'-bis(α,α-dimethylbenzyl)phenyl]benzotriazole, 2-(2'-hydroxy-3',5'-di-t-butylphenyl)benzotriazole, 2,4-dihydroxybenzophenone, 2,4-dihydroxy-4-methoxybenzophenone, 2,4-dihydroxy-4-methoxybenzophenone-5-sulfonic acid, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, or 2,4-diphenyl-6-(2-hydroxy-4-butoxyphenyl)-1,3,5-triazine.

The UV absorbent may be present in the optical adhesive composition in an amount of about 0.1 to about 5 wt %, in terms of solid content. Within this range, the optical adhesive film prepared from the optical adhesive composition may be prevented from yellowing on the surface thereof after curing.

Antioxidant

The antioxidant may help prevent oxidation of the optical adhesive composition, thereby improving thermal stability. The antioxidant may include at least one selected from the group of phenol, quinone, amine, and phosphite compounds, without being limited thereto. Examples of the antioxidant may include pentaerythritol tetrakis[3-(3,5-di-t-butyl-4-hydroxyphenyl)propionate] and tris(2,4-di-t-butylphenyl)phosphite.

The antioxidant may be present in the optical adhesive composition in an amount of about 0.01 to about 5 wt %, e.g., about 0.01 to about 1 wt %, in terms of solid content. Within this range, the optical adhesive film prepared from the optical adhesive composition may be prevented from decomposing after curing and may exhibit excellent heat stability.

The optical adhesive composition may further include a silane coupling agent to help enhance adhesion to window glass. The silane coupling agent may be any suitable silane coupling agent including, e.g., a vinyl group or a mercapto group. For example, the silane coupling agent may include at least one selected from the group of polymerizable unsaturated group containing silicon compounds, such as trimethoxysilane, vinyltriethoxysilane, and (meth)acryloxypropyltrimethoxysilane; silicon compounds having an epoxy structure, such as 3-glycidoxypropyltrimethoxysilane 3-glycidoxypropylmethyldimethoxysilane and 2-(3,4-epoxycyclohexyl)ethyltrimethoxysilane; amino group containing silicon compounds, such as 3-aminopropyltrimethoxysilane, N-(2-aminoethyl)-3-aminopropyltrimethoxysilane and N-(2-aminoethyl)-3-aminopropylmethyldimethoxysilane; and 3-chloropropyltrimethoxysilane, without being limited thereto.

The silane coupling agent may be present in an amount of about 0.1 to about 6 parts by weight, e.g., about 0.1 to about 3 parts by weight, based on 100 parts by weight of the optical adhesive composition. Within this range, excellent adhesion to glass may be exhibited.

The optical adhesive composition may have a curing contraction ratio of about 1% or less. Within this range, warpage (that occurs after curing with increasing area) of the optical adhesive film prepared from the optical adhesive composition may be reduced and/or prevented. The curing contraction ratio may be calculated using the specific gravity of the adhesive composition in a liquid state before curing and the specific gravity of the optical adhesive film having a thickness of about 200 μm obtained by depositing the optical adhesive composition on a PET release film and curing at about 3,000 to about 5,000 mJ/cm$^2$:

Curing contraction ratio (%)=(Specific gravity of adhesive composition in liquid state before curing−Specific gravity of solid adhesive composition after curing)/Specific gravity of adhesive composition in liquid state before curing×100.   [Equation 1]

In an implementation, the curing contraction ratio may be about 0.1 to about 0.7%.

The optical adhesive composition may exhibit a reduced curing contraction ratio. The optical adhesive composition may prepare an optical adhesive film having enhanced elongation as well as reduced tensile strength, thereby helping to prevent warpage (that may occur in medium and large-sized non-mobile display devices after photo-curing).

The optical adhesive composition may have a viscosity of about 500 to about 20,000 cps at about 25° C.

Another embodiment provides a display apparatus. The display apparatus may include the optical adhesive film according to an embodiment. The display apparatus may be prepared by, e.g., depositing the optical adhesive composition according to an embodiment between a window glass layer and an ITO film and curing at about 2,000 to 6,000 mJ/cm$^2$.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

A description of details apparent to those skilled in the art may be omitted herein.

Preparative Example 1

Preparation of urethane (meth)acrylate Copolymer 80 g of polypropylene glycol and 10 g of 1,4-butanediol were put in a 2 L four-neck flask, which was equipped with a reflux cooling system at one side, a thermometer at another side, and a dropping funnel at a third side. The solution in the flask was heated to 60° C., and 1.3 g of dibutyltin dilaurate (DBTDL) dissolved in toluene at a concentration of 10% was added thereto. 6 g of isophorone diisocyanate and 0.7 g of aliphatic polyisocyanate based on hexamethylene diisocyanate (AE700-100, ASAHI KASEI) were sequentially added to the flask and reacted at 75° C. After identifying disappearance of remaining isocyanate using IR, the flask was cooled to 50° C., and 1 g of 2-methacryloyloxyethyl isocyanate (MOI) was added thereto. The flask was maintained at 50° C. for 2 hours, followed by identifying disappearance of remaining isocyanate using IR, thereby producing a urethane (meth)acrylate copolymer.

Preparative Example 2

Preparation of urethane (meth)acrylate Copolymer

A urethane (meth)acrylate copolymer was prepared in the same manner as in Preparative Example 1 except that 1 g of 3-isocyanatopropyltriethoxysilane was added and further reacted for 1 hour after adding the 1 g of 2-methacryloyloxyethyl isocyanate (MOI) and then identifying disappearance of remaining isocyanate using IR.

Preparative Example 3

Preparation of Urethane Acrylate Copolymer 89.45 g of polypropylene glycol was put in a 2 L four-neck flask, which was equipped with a reflux cooling system at one side, a thermometer at another side, and a dropping funnel at a third side. The solution in the flask was heated to 60° C., and 1.3 g of dibutyltin dilaurate (DBTDL) dissolved in toluene at a concentration of 10% was added thereto. 9.15 g of isophorone diisocyanate and 0.7 g of a hexamethylene diisocyanate cyclic trimer (HDI Trimer, DESMODUR N-3300, Bayer) were sequentially added to the flask and reacted at 75° C. Upon reaching theoretical NCO % after reaction for 3 hours, the flask was cooled to 60° C., and 3.37 g of 2-hydroxyethyl acrylate was added thereto. The flask was maintained at 60° C. for 2 hours, followed by identifying disappearance of remaining isocyanate using IR, thereby producing a urethane acrylate copolymer.

Preparative Example 4

Preparation of Urethane Acrylate Copolymer 89.45 g of polypropylene glycol was put in a 2 L four-neck flask, which was equipped with a reflux cooling system at one side, a thermometer at another side, and a dropping funnel at a third side. The solution in the flask was heated to 60° C., and 1.3 g of dibutyltin dilaurate (DBTDL) dissolved in toluene at a concentration of 10% was added thereto. 9.52 g of isophorone diisocyanate and 0.3 g of a hexamethylene diisocyanate cyclic trimer (HDI Trimer, DESMODUR N-3300, Bayer) were sequentially added to the flask and reacted at 75° C. Upon reaching theoretical NCO % after reaction for 3 hours, the flask was cooled to 60° C., and 3.37 g of 2-hydroxyethyl acrylate was added thereto. The flask was maintained at 60° C. for 2 hours, followed by identifying disappearance of remaining isocyanate using IR, thereby producing a urethane acrylate copolymer.

Details of components used in Examples and Comparative Examples are described as follows.

Urethane (meth)acrylate copolymer: Urethane (meth)acrylate copolymers prepared in Preparative Examples 1 to 4

Reactive monomer: 4-hydroxybutyl acrylate (4-HBA), 2-hydroxyethyl methacrylate (2-HEMA), isobornyl acrylate (IBXA), acryloyl morpholine (ACMO), β-carboxyethyl acrylate (β-CEA), vinyltrimethoxysilane (A-171)

Initiator: Irgacure 184, Irgacure 754
UV absorbent: Tinuvin 384-2
Antioxidant: Irganox 1010

Examples 1 to 4

Preparation of Optical Adhesive Composition

An optical adhesive composition was prepared by mixing the components according to compositions listed in Table 1 and stirring the mixture for 1 hour or longer.

Comparative Examples 1 and 2

Preparation of Optical Adhesive Composition

An optical adhesive composition was prepared by mixing the components according to a composition listed in Table 1 and stirring the mixture for 1 hour or longer.

a film having a thickness of 500 μm, followed by measuring a distance when the film was broken using an Instron Series 1×/s Automated Materials Tester 3343.

2. Tensile Strength

Tensile strength was measure while measuring elongation.

3. Curing Contraction Ratio

Each of the optical adhesive compositions prepared in Examples 1-4 and Comparative Examples 1 and 2 was cured. After the specific gravity of each adhesive composition in a liquid state before curing and the specific gravity of the optical adhesive film having a thickness of 200 μm obtained by depositing the adhesive composition on a PET release film and curing at 3,000 mJ/cm$^2$ were measured by digital solid density measurement equipment (DME-220E, Shinko Denshi Co., Ltd.), a curing contraction ratio was calculated by Equation 1:

Curing contraction ratio (%)=(Specific gravity of adhesive composition in liquid state before curing−Specific gravity of solid adhesive composition after curing)/Specific gravity of adhesive composition in liquid state before curing×100.

4. Adhesive Strength

Adhesive strength between glass sheets was measured. While pushing an upper glass sheet at a force of 200 kgf at ° C. from a lateral side, separation force was measured using a bond tester (Dage series 4000PXY). A 1.5 cm×1.5 cm×1 mm upper glass sheet and a 2 cm×2 cm×1 mm lower glass sheet were used, and the adhesive layer had a thickness of 500 μm.

5. Evenness Value

Each optical adhesive composition deposited to a thickness of 200 μm between glasses was cured at 3,000 mJ/cm$^2$, followed by measuring evenness value after curing to evaluate glass deformation. Evenness value was directly proportional to a degree of deformation.

6. Refractive Index

Refractive index was evaluated by ASTM D1218. Each adhesive composition was deposited to a thickness of 200 μm on a PET release film and cured at 3,000 mJ/cm$^2$. The refractive index of the prepared film was measured by ABBE5 (Bellingham/Stanley Ltd.).

7. Visible Light Transmittance

The visible light transmittance of the prepared 200 μm-thick film was measured in a range of 400 to 800 nm using a Lambda 950 (Perkin-Elmer).

TABLE 1

| | | Example | | | | Comparative Example | |
|---|---|---|---|---|---|---|---|
| | | 1 | 2 | 3 | 4 | 1 | 2 |
| Urethane (meth)acrylate copolymer | Preparative Example 1 | 77 | — | — | — | — | — |
| | Preparative Example 2 | — | 77 | 57 | 87 | — | — |
| | Preparative Example 3 | — | — | — | — | 77 | — |
| | Preparative Example 4 | — | — | — | — | — | 77 |
| Reactive monomer | 4-HBA | 3 | 3 | 13 | 1 | 3 | 3 |
| | 2-HEMA | 1 | 1 | 6 | 1 | 1 | 1 |
| | IBXA | 7 | 7 | 12 | 1 | 7 | 7 |
| | ACMO | 2 | 2 | 2 | 2 | 2 | 2 |
| | β-CEA | 4 | 4 | 4 | 2 | 4 | 4 |
| | A-171 | 1 | 1 | 1 | 1 | 1 | 1 |
| Photoinitiator | Irgacure 184 | 2 | 2 | 2 | 2 | 2 | 2 |
| | Irgacure 754 | 2 | 2 | 2 | 2 | 2 | 2 |
| UV absorbent | Tinuvin 384-2 | 0.9 | 0.9 | 0.9 | 0.9 | 0.9 | 0.9 |
| Antioxidant | Irganox 1010 | 0.1 | 0.1 | 0.1 | 0.1 | 0.1 | 0.1 |

Experiment

Evaluation of Properties of Optical Adhesive Composition

Each of the optical adhesive compositions of Examples 1-4 and Comparative Examples 1 and 2 was evaluated in terms of the following properties and the results are shown in Table 2.

<Evaluation Method>

1. Elongation

A specimen was prepared and evaluated by ASTM D638. Each of the optical adhesive compositions prepared in Examples 1-4 and Comparative Examples 1 and 2 was deposited on a PET release film and cured at 3,000 mJ/cm$^2$ to obtain

TABLE 2

|  | Example | | | | Comparative Example | |
|---|---|---|---|---|---|---|
|  | 1 | 2 | 3 | 4 | 1 | 2 |
| Elongation rate (%) | 710 | 700 | 700 | 400 | 190 | 280 |
| Tensile strength (gf/mm²) | 4 | 3 | 3 | 6 | 25 | 29 |
| Curing contraction ratio (%) | 0.6 | 0.6 | 0.6 | 0.7 | 1.9 | 1.8 |
| Adhesion (kgf) | 49 | 50 | 51 | 49 | 34 | 42 |
| Evenness | 0.0325 | 0.0355 | 0.0365 | 0.0389 | 0.1358 | 0.1478 |
| Refractive index | 1.47 | 1.47 | 1.47 | 1.47 | 1.47 | 1.47 |
| Visible light transmittance (%) | 93 | 93 | 93 | 92 | 93 | 93 |

Figure 2:
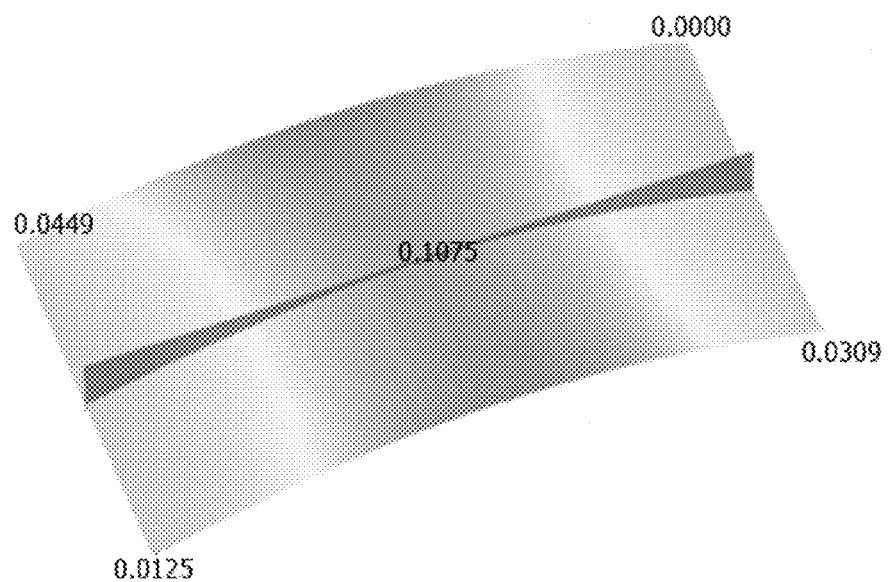
FIG. 2 illustrates a perspective view of an optical adhesive composition according to Comparative Example 1 after photo-curing.
Figure 3:
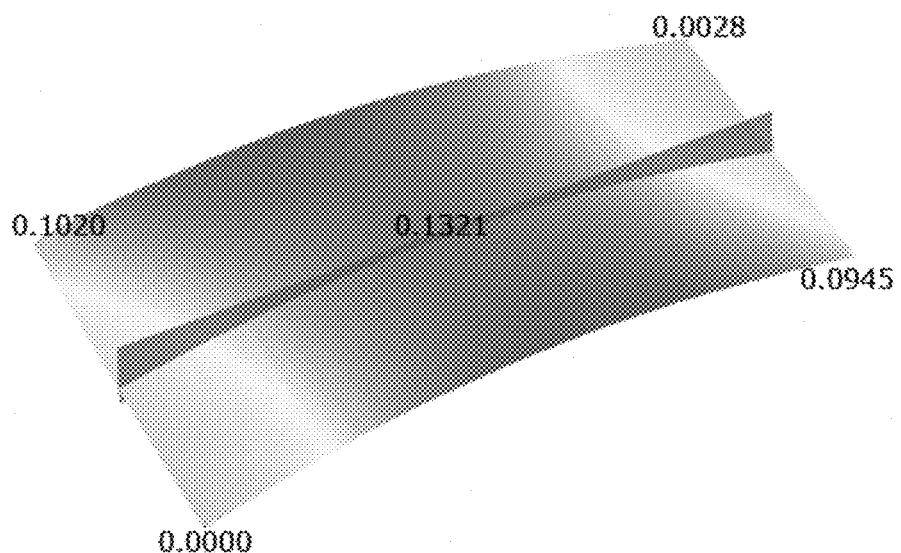
FIG. 3 illustrates a perspective view of an optical adhesive composition according to Comparative Example 2 after photo-curing.

As shown Table 2, optical adhesive films prepared from the optical adhesive compositions including the urethane (meth) acrylate copolymer according to Examples 1 to 4 exhibited a low values when measured for evenness and thus did not involve warpage (see FIG. 1 showing even shading indicative of little to no warping). However, optical adhesive films prepared from the optical adhesive compositions, which respectively include the urethane acrylate copolymer prepared without isocyanate represented by Formula 1 and using a conventionally used HDI trimer according to Comparative Examples 1 and 2, exhibited high values when measured for evenness and thus exhibited warpage (see FIGS. 2 and 3 showing non-uniform shading indicative of warping).

By way of summation and review, OCA films may have limitations in use with development of various shapes of mobile phones, and lower priced OCA films may be desirable. Further, an OCA film may basically be a solid transparent tape. Thus, when the OCA film is disposed between window glass and a touch panel to be bonded, prevention of bubbles formed due to a momentary inflow of air may be desirable.

The embodiments provide a liquid optically-curable adhesive which is a resin-type rather than a film-type.

The embodiments provide an optical adhesive composition for displays, the composition preparing an optical adhesive film having improved elongation and tensile strength that helps reduce and/or prevent warpage.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An optical adhesive film prepared from an optical adhesive composition, the optical adhesive film having an elongation of about 200 to about 800% and a tensile strength of about 10 gf/mm² or less after curing, and the optical adhesive composition including a urethane (meth)acrylate copolymer, a reactive monomer, and an initiator,
wherein the urethane (meth)acrylate copolymer includes a hydroxyl group and a vinyl group.

2. The optical adhesive film as claimed in claim 1, wherein the tensile strength is about 0.1 to about 10 gf/mm².

3. The optical adhesive film as claimed in claim 1, wherein the urethane (meth)acrylate copolymer includes a copolymer obtained by copolymerization of a urethane polyol and a monomer having an isocyanate group and a vinyl group.

4. The optical adhesive film as claimed in claim 3, wherein the urethane polyol includes a hydroxyl group.

5. The optical adhesive film as claimed in claim 3, wherein the urethane polyol includes a copolymer obtained by copolymerization of a polyol and an isocyanate compound.

6. The optical adhesive film as claimed in claim 5, wherein:
the isocyanate compound has a structure represented by Formula 1:

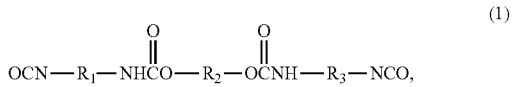

and
$R_1$, $R_2$, and $R_3$ are each independently —$(CH_2)_n$—, in which n is an integer from 1 to about 10.

7. The optical adhesive film as claimed in claim 3, wherein the urethane (meth)acrylate copolymer is further polymerized with a monomer having a silane group and an isocyanate group.

8. An optical adhesive composition, comprising:
a reactive monomer,
an initiator, and
a urethane (meth)acrylate copolymer, the urethane (meth) acrylate copolymer including a copolymer obtained by copolymerization of a urethane polyol and a (meth) acrylic monomer having an isocyanate group and a vinyl group such that the urethane (meth)acrylate copolymer includes a hydroxyl group and a vinyl group.

9. The optical adhesive composition as claimed in claim 8, wherein the urethane polyol includes a hydroxyl group.

10. The optical adhesive composition as claimed in claim 8, further comprising a UV absorbent, an antioxidant, or a combination thereof.

11. The optical adhesive composition as claimed in claim 8, wherein the urethane polyol includes a copolymer obtained by copolymerization of a polyol and an isocyanate compound.

12. The optical adhesive composition as claimed in claim 11, wherein:
the isocyanate compound includes a compound having a structure represented by Formula 1:

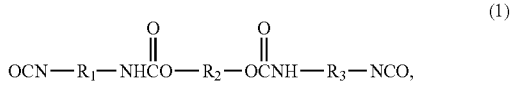

and
R$_1$, R$_2$, and R$_3$ are each independently —(CH$_2$)$_n$—, in which n is an integer from 1 to about 10.

13. The optical adhesive composition as claimed in claim 11, wherein the polyol includes at least two polyols, the polyols including ethylene glycol, polyethylene glycol, propylene glycol, polypropylene glycol, polytetramethylene glycol, tetramethylene glycol, 1,3-butanediol, 1,4-butanediol, 1,6-hexanediol, neopentyl glycol, polycarbonate polyol, polyester polyol, or 1,4-cyclohexane dimethanol.

14. The optical adhesive composition as claimed in claim 12, wherein the isocyanate compound further includes another compound, the other compound including isophorone diisocyanate, toluene diisocyanate, diphenylmethane diisocyanate, hexamethylene diisocyanate, xylene diisocyanate, hydrogenated diphenylmethane diisocyanate, naphthalene diisocyanate, or a combination thereof.

15. The optical adhesive composition as claimed in claim 8, wherein the urethane (meth)acrylate copolymer is present in the optical adhesive composition in an amount of about 35 to about 93.45 wt %, in terms of solid content.

16. The optical adhesive composition as claimed in claim 11, wherein the copolymerization of the polyol and the isocyanate compound is performed in the presence of a catalyst, the catalyst including dibutyltin dilaurate (DBTDL), triethylenediamine (TEDA), 1,4-diazabicyclo[2.2.2]octane, or a combination thereof.

17. The optical adhesive composition as claimed in claim 16, wherein the catalyst is present in an amount of about 0.05 to about 2 parts by weight, based on 100 parts by weight of the isocyanate compound.

18. The optical adhesive composition as claimed in claim 8, wherein the copolymer is further polymerized with a monomer having a silane group and an isocyanate group.

19. The optical adhesive composition as claimed in claim 8, further comprising a silane coupling agent.

20. The optical adhesive composition as claimed in claim 8, wherein the monomer having the isocyanate group and the vinyl group includes (meth)acryloyloxyethyl isocyanate 3-isocyanatopropyl (meth)acrylate, or a combination thereof.

21. The optical adhesive composition as claimed in claim 8, wherein the reactive monomer includes a reactive (meth)acrylate monomer.

22. The optical adhesive composition as claimed in claim 8, wherein the reactive monomer includes a (meth)acrylic acid ester having a hydroxyl group and a C2 to C20 alkyl group, a (meth)acrylic acid ester having a C6 to C20 polyalicyclic ring, a (meth)acrylic monomer having a C4 to C6 heteroalicyclic ring including nitrogen, oxygen, or sulfur, a (meth)acrylic monomer containing a carboxyl group, and a monomer having a vinyl group and a silane group.

23. The optical adhesive composition as claimed in claim 8, wherein the initiator includes a photoinitiator.

24. The optical adhesive composition as claimed in claim 8, wherein the optical adhesive composition has a curing contraction ratio of about 1% or less.

25. The optical adhesive composition as claimed in claim 8, wherein the optical adhesive composition has a viscosity of about 500 to about 20,000 cps at 25° C.

26. A display panel comprising the optical adhesive film as claimed in claim 1.

* * * * *